Figure 10:
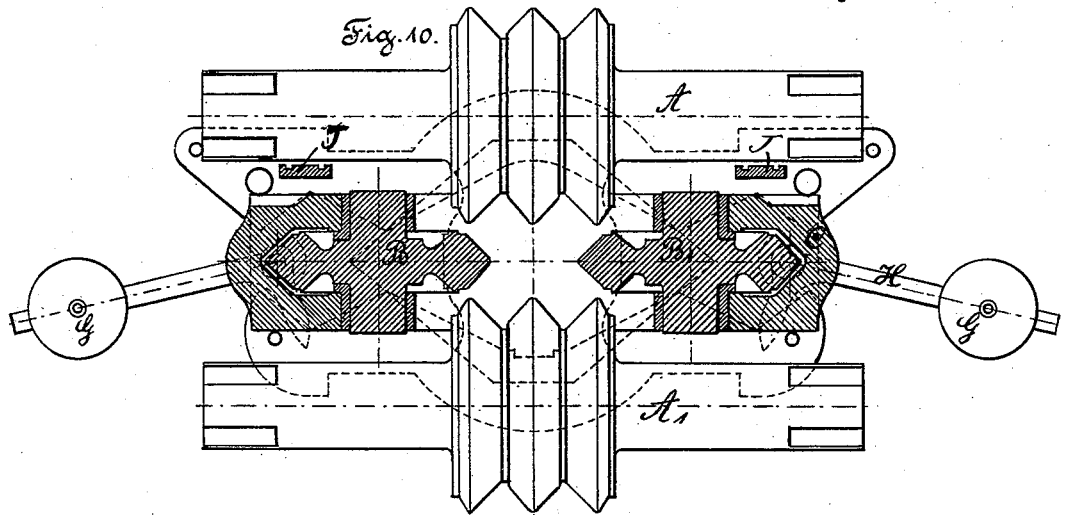
Figure 11:
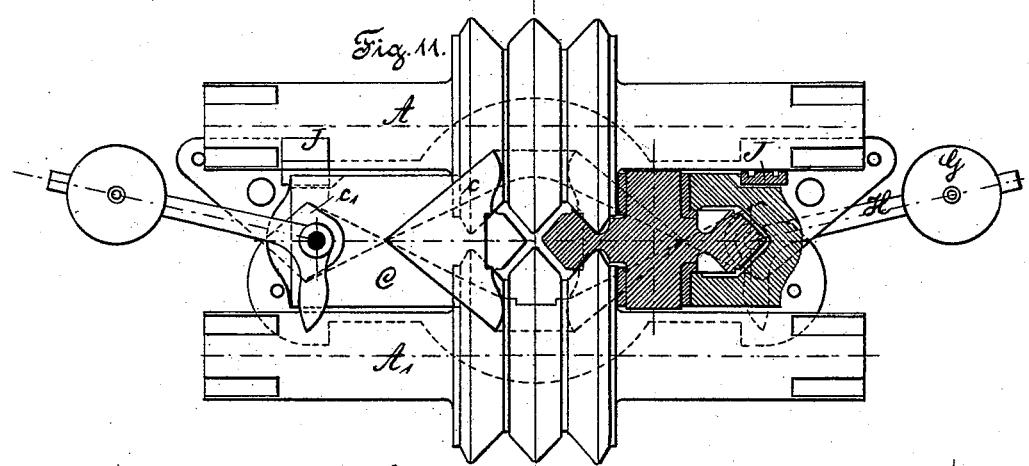
Figure 12:
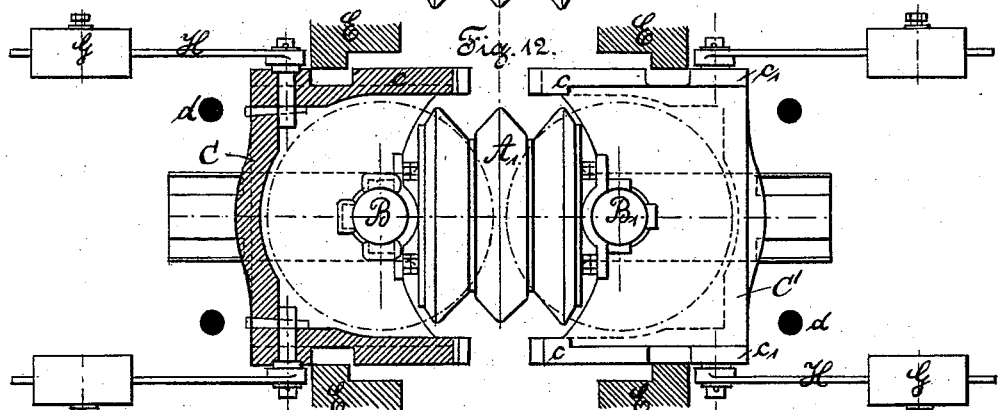

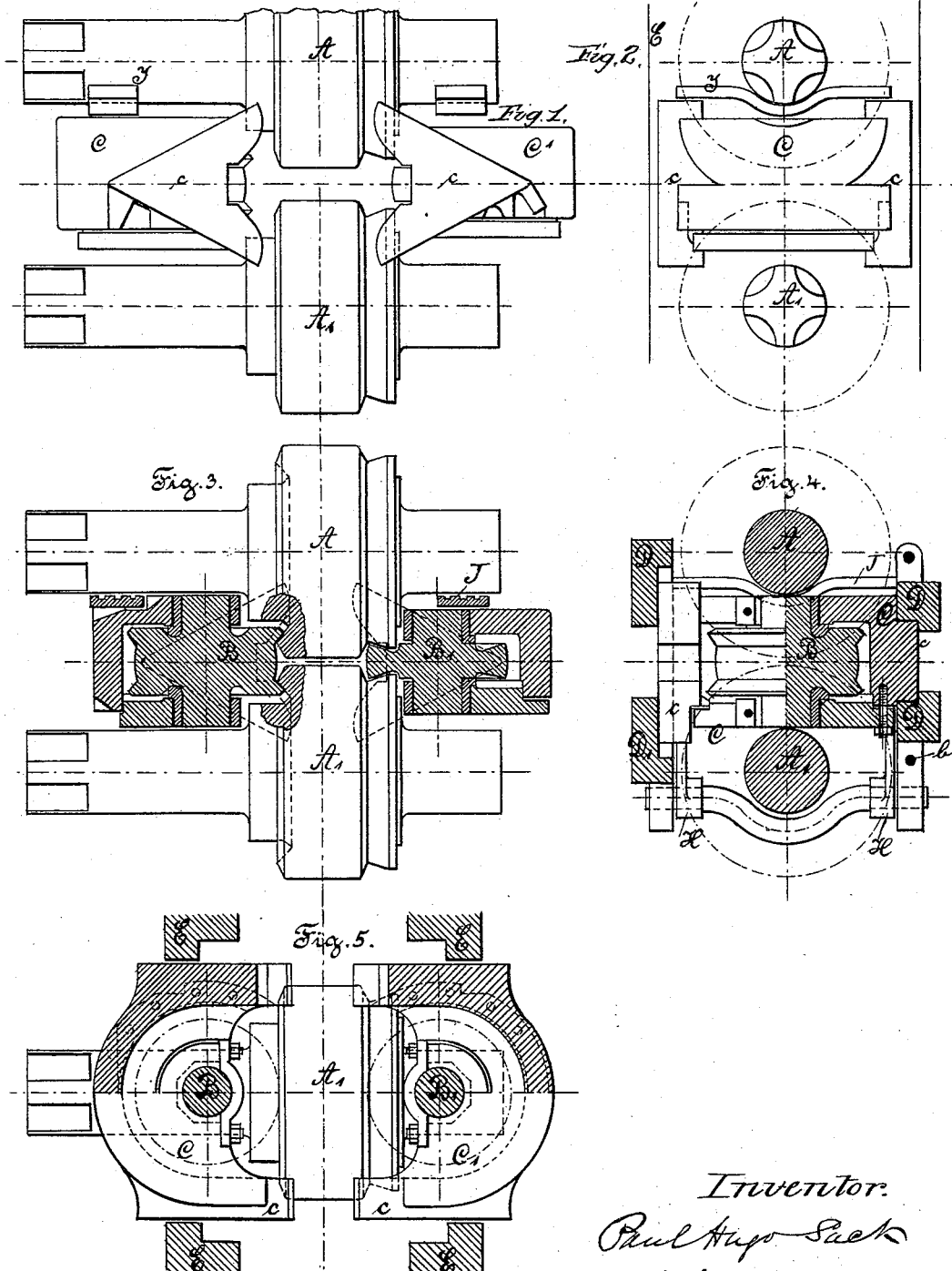

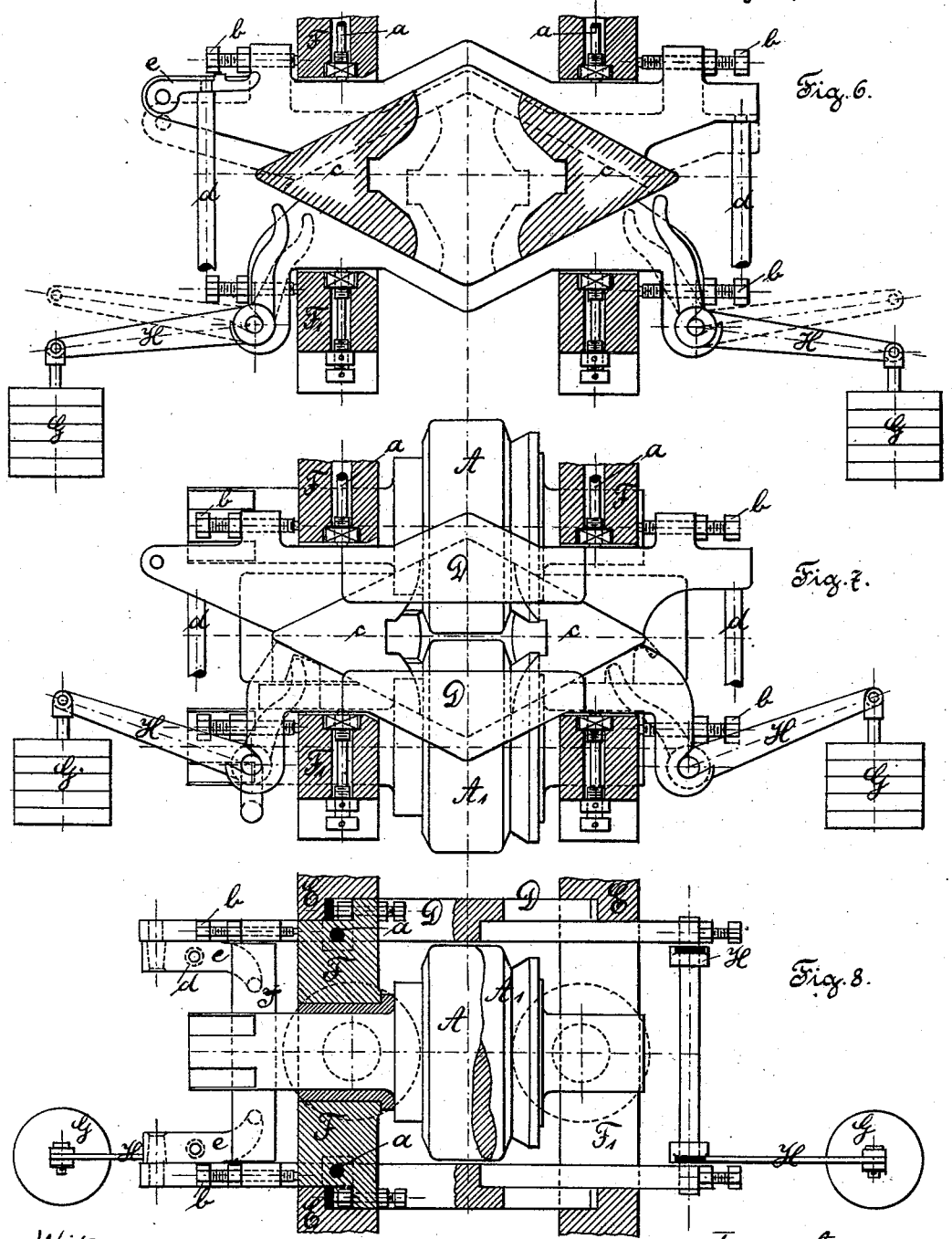

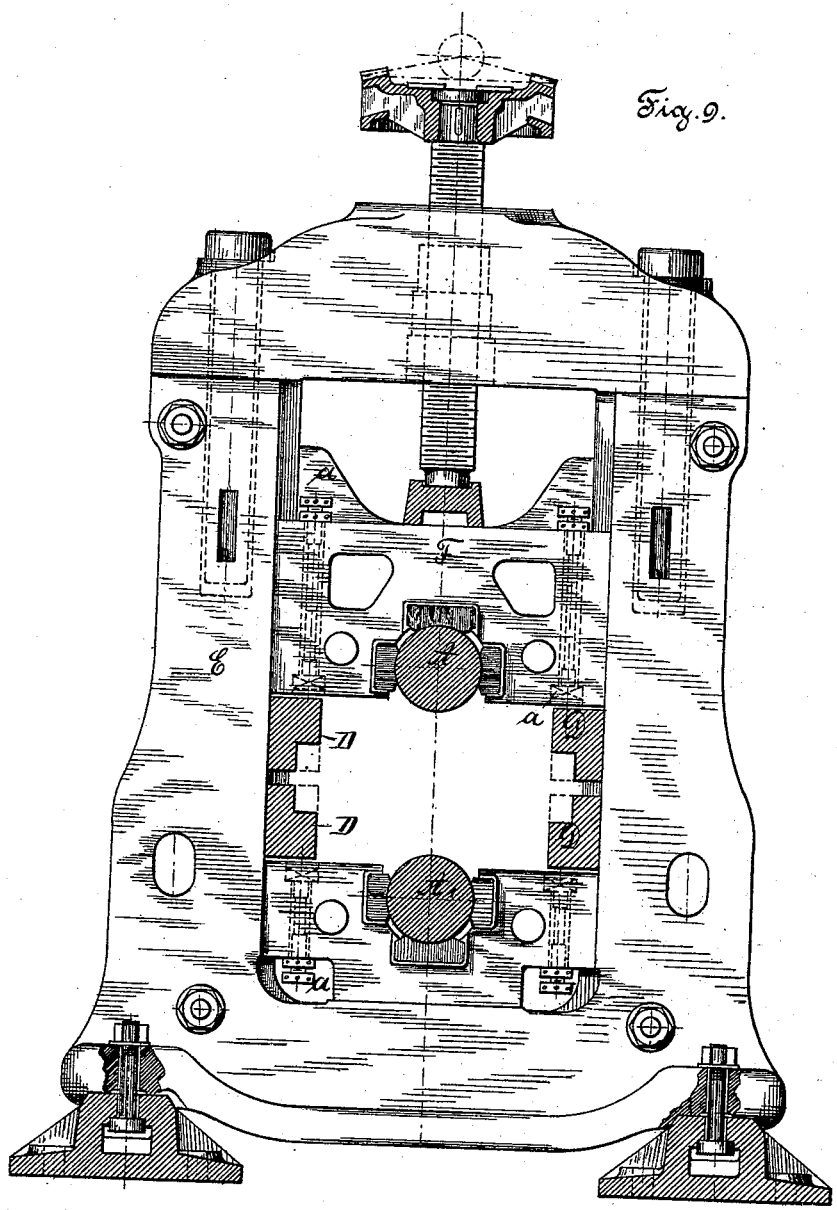

(No Model.) 6 Sheets—Sheet 4.

P. H. SACK.
ROLLING MILL.

No. 431,623. Patented July 8, 1890.

Witnesses
Inventor
Paul Hugo Sack
by his Attorney (No Model.)  6 Sheets—Sheet 5.
P. H. SACK.
ROLLING MILL.
No. 431,623.  Patented July 8, 1890.
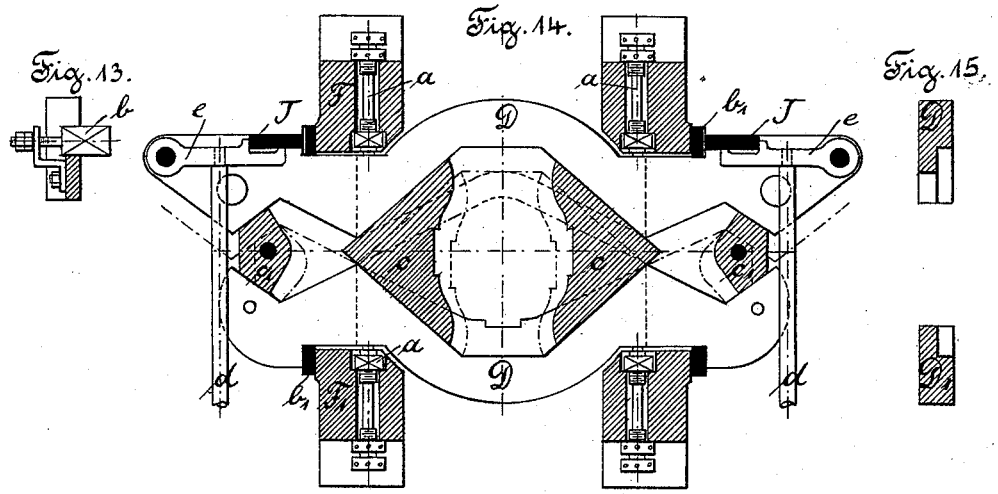
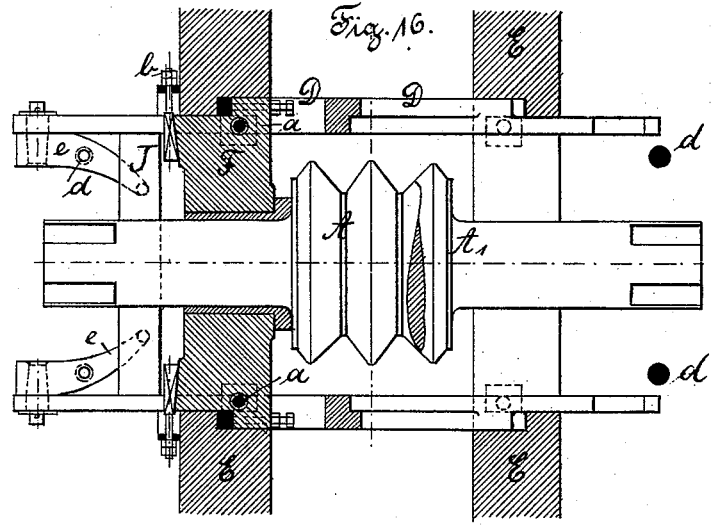
Witnesses
R. Haddan
E. H. Clemens
Inventor
Paul Hugo Sack
by W. R. Haddan
His Attorney.

(No Model.)　　　　　　　　P. H. SACK.　　　　　　6 Sheets—Sheet 6.
ROLLING MILL.

No. 431,623.　　　　　　　　　　　　Patented July 8, 1890.

Witnesses
O. Haddan
E. L. Clemens

Inventor
Paul Hugo Sack
By N. Haddan
His Attorney

UNITED STATES PATENT OFFICE.

PAUL HUGO SACK, OF DUISBURG, GERMANY.

ROLLING-MILL.

SPECIFICATION forming part of Letters Patent No. 431,623, dated July 8, 1890.

Application filed January 30, 1888. Serial No. 262,371. (No model.)

*To all whom it may concern:*

Be it known that I, PAUL HUGO SACK, a subject of the German Emperor, and a resident of Duisburg, (near the Rhine,) in Germany, have invented a new and useful Improvement in Rolling-Mills, of which the following is a specification.

This invention relates to universal rolling-mills having horizontal and vertical rolls, the axes of which are situated in the same plane or substantially the same plane; and the object of the improvement is to more effectually provide for the supporting and simultaneous adjustment of the rolls and to enable their relative position to be corrected and modified.

To this end the invention consists in the combination and relative arrangement of parts hereinafter described, and specifically pointed out in the claims.

In general the invention is applicable to various shapes of rolls and is equally suitable for one vertical roll—for instance, for rolling flange tram-rail and T-rail sections, as well as for two vertical rolls.

The following description describes the invention as applied to the rolling of H and cruciform sections.

In previous systems of adjustable rolls the relative position of the rolls is made dependent upon contact of certain surfaces of the rolls with each other—for instance, by inclined surfaces on the horizontal rolls overlapping undercut surfaces of the vertical rolls in contact therewith. A wedge-like action is thereby produced by the resistance of the blank rolled, and the said surfaces are exposed to great friction and rapid wear, having to be frequently renewed and refaced to maintain the relative positions of the rolls. Furthermore, in such systems it is necessary to avoid small angles of inclination of the overlapping surfaces, notwithstanding that the same are often necessary or essential to the proper rolling of certain sections. The improved system differs from that set forth above in that in no position of the rolls are the same in contact with each other, their correct relative position being, however, attained.

Referring to the accompanying drawings, Figure 1 illustrates in front elevation the rolls for H-section in their extended position and housing-boxes of the vertical rolls. Fig. 2 is an elevation from the rear of one of the housing-boxes of the vertical rolls, showing also the spindles of the horizontal rolls and bearing-rails therefor. Fig. 3 illustrates the rolls in the position of their nearest approach, the vertical rolls and their housing-boxes being shown in section. Fig. 4 is a side elevation, partly in section, of a vertical housing-box and roll, showing also in section the setting-rails for the vertical housing-blocks. Fig. 5 illustrates in plan and partial section the vertical housing-boxes, and shows the lower horizontal roll, and in cross-section the frame E, guiding the horizontal housing-boxes. Fig. 6 shows in elevation the setting-rails and wedges on the vertical housing-boxes, the position shown in full lines being at first pass, and the position shown in dotted lines at last pass. Fig. 7 is a similar view with horizontal rolls inserted. Fig. 8 is a plan thereof, showing to the left the upper roll and to the right the lower roll. Fig. 9 is an elevation of one of the main truss-frames and adjusting-spindle for the upper horizontal roll. Figs. 10 to 16 are views of a similar system as applied, however, to rolls for cruciform section, Fig. 13 being a cross-section at the end of one of the setting-rails, showing wedge for horizontal adjustment, and Fig. 15 a central cross-section of a setting-rail. Figs. 17 to 20 are diagrammatic views hereinafter described.

A is the upper horizontal roll, A′ the lower horizontal roll, B and B′ are the vertical rolls. The rolls shown are such as are described in my Patent No. 365,100, for the rolling of H-sections. I provide the said vertical rolls with large spindles able to sustain the great pressure of rolling, which by this invention is borne by the spindles instead of by the edge of the horizontal rolls, as was formerly the case with closed rolls. The spindles of the vertical rolls are journaled in housing-boxes C C′, having on their sides the wedge-shaped blocks or projections c c, formed integral with the housing-blocks or fixed thereto so as to lie in parallel planes with their apexes directed away from the roll and their heels toward it. The wedge on the side of one of the housing-boxes is in the same vertical plane with that on the corresponding side of the other housing-box, and the other two wedges are likewise in the same vertical plane on the other side of the housing-boxes. Over and under each pair of wedges extend rails D, having extending from their center in both directions inclined planes exactly fitting to and abutting on the exterior edges of the wedges c c, one setting-rail under and one over each pair of wedges. It is obvious that by bringing the rails D together, as shown in Fig. 6, their inclined faces, pressing on the wedges c c, will drive the said wedges inward, and with them the housing-boxes C C', and consequently the vertical rolls B B'. Since, also, the rails D are connected, as hereinafter set forth, with the housing-boxes of the horizontal rolls, so as to move therewith, the depression of the upper horizontal-roll housing-box (the lower housing-box with its horizontal roll remaining stationary) will cause the approach of the rails D to each other and the consequent approach of the wedges c c and the vertical rolls. The relative approach of the rolls will therefore correspond to the inclination of the faces of the wedges and of the rails D. If the wedge-faces make a right angle to each other, the approach of the horizontal rolls to each other will be equaled by that of the vertical rolls. If the wedges be obtuse-angled, the horizontal rolls will approach more than the vertical rolls, and if the wedges be acute-angled the vertical rolls will approach more than the horizontal rolls. The setting-rails D are guided vertically in the truss-frames E of the mill, and they are preferably flanged out on their outer faces to overlap the wedges c c, so that the housing-blocks are held against lateral displacement, and the vertical rolls are maintained always in the central vertical plane of the mill. The horizontal rolls are also journaled in suitable bearing-blocks F, vertically guided by the truss-frames. The rails D are guided by the bearing-blocks F, one on each side of the latter. Truly speaking, the upper rails D are carried by the wedges c c, on which they rest; but the rails are adjusted from the bearing-blocks F in vertical direction by the screws a, with nuts thereon, and in horizontal direction by screws b, Fig. 7. The exact position of the rails D is a matter of importance, since it affects the setting of the vertical rolls with reference to the horizontal rolls—for instance, for different shapes of section. Since all these screws are easily accessible, the correcting or modifying of the relative position of the rolls may, if necessary, be made while the mill is at work. The lower horizontal roll, with its bearing-blocks and the lower rails D, is stationary in the base of the truss-frame; but the upper horizontal roll, with its bearing-blocks and rails D, is movable together as one part by the screw spindle or spindles shown in Fig. 9. The whole roll is therefore operated by the screw-spindle screwing down the upper horizontal roll, so that it becomes less and less for each pass, as indicated by Fig. 6. The lower horizontal roll being stationary and the upper roll movable, the vertical rolls also move downward during their approach; but they are held always centrally between the horizontal rolls (although this is not necessarily essential for all rolling) by the symmetrical arrangement of the inclined surfaces of the wedges above and below the horizontal plane. The wedges c c are held outward in the setting-rails D and prevented from sliding down on the lower setting-rails (which, by their weight, they would tend to do) by the balance-weights G, acting through bell-crank levers H, arranged in any suitable manner to have an outward thrust on the wedges or on the housing-blocks C C', as may be convenient. The balance-weights may also be replaced by steam or hydraulic plungers and cylinders, if convenient. When the angles of the wedges on the housing-boxes are comparatively obtuse, the housing-boxes are provided with additional wedges c' c' behind the first and the setting-rails D with corresponding inclined planes. The housing-boxes are thereby more accurately and securely held in their vertical position.

Although in the said mill the rolls are not in contact and fins are therefore produced at the intervals between the rolls, the said fins are removed by turning the blank after each pass for a half-turn in the case of the H-section mill and for a quarter-turn in the case of the cruciform-section mill. In the first instance the fins produced on the two outer edges of the flange on the right of the blank side during one pass are effaced by being passed into the closed angles of the left vertical roll, while the fins produced on the inner edges of the left-hand flange during the said former pass are effaced by the closed angles of the horizontal rolls in the next pass.

Figure 17:
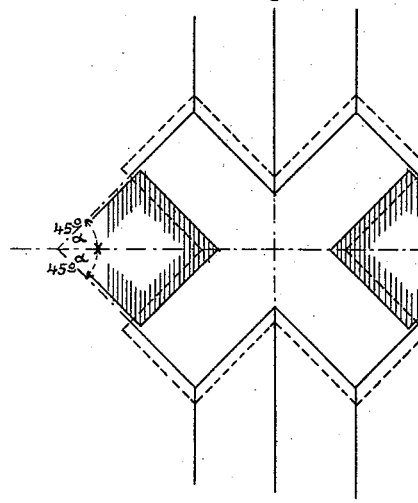

The mill for cruciform section operates in the same manner for effacement of fins, those formed on one pass being effaced by closed angles during the next pass. It is, however, found in practice that this is not alone sufficient when the approach of the roll is equal from all sides, as indicated in Fig. 17, in which the entering blank is shown in dotted lines. The angle $\alpha$, which is the angle against the horizontal plane made by the undercut surface of the vertical rolls and corresponding overlapping position of the horizontal rolls, is here equal to forty-five degrees, and great pressure takes place on the metal near to the interstices between the rolls, and, notwithstanding the rounded or beveled nature of the edge of the blank inserted there, (the rolls being shaped for webs with thickened edges, Fig. 20,) fins occur. Further, if the distance between the outer edges of the vertical rolls were equal to that between the corresponding edges of the horizontal rolls, which will happen when the angle $\alpha$ equals forty-five degrees, it is evident that the vertical rolls would, by reason of their greater diameter, (caused by the more obtuse angle required for avoiding jamming of the rolls,) grip the bar sooner than the horizontal rolls, and as the vertical rolls are not driven the bar would not be drawn through the mill. To overcome these difficulties, and also to avoid completely the formation of any fin and to take a considerable amount of pressure from the vertical rolls, the aforesaid angle $\propto$ of inclination of the superposed inclined surfaces of the rolls is slightly less than forty-five degrees, and consequently the edges of the cruciform section are not quite square with the surface of the flanges, as may be seen from Fig. 18, which shows two successive sections, that in full lines (the position of the rolls) being the later pass and the section in dotted lines the previous pass. The reduction of the area of cross-section takes place only in a vertical direction, and the function of the vertical rolls is only to keep the bar laterally in shape, thus relieving said vertical rolls of considerable pressure. The formation of fins is avoided, since the material receives no pressure in the direction of the interstice between the rolls.

Figure 18:
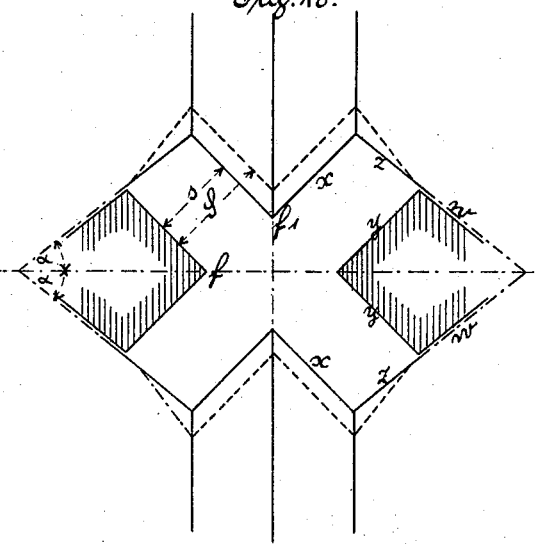
Figure 19:
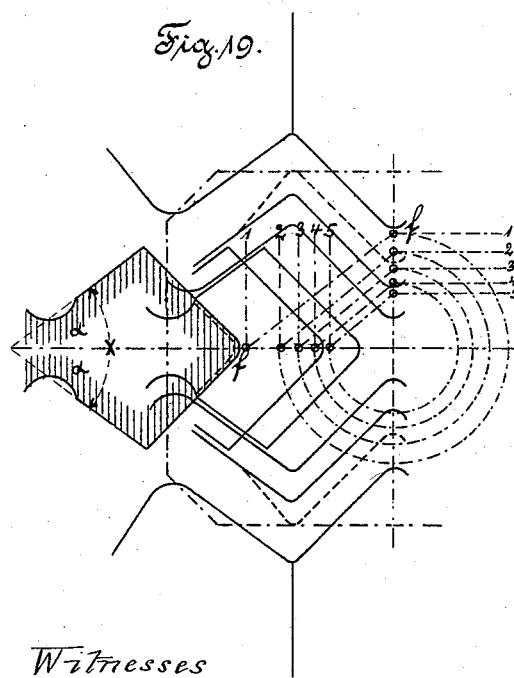
Figure 20:
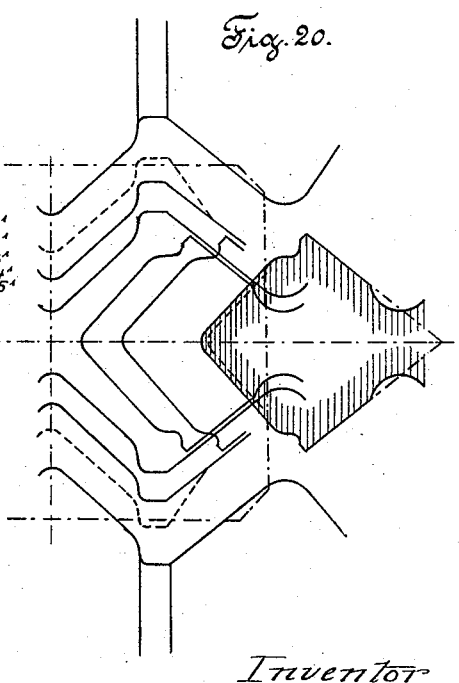

From Fig. 18 it will be seen that the distance between the working-edges of the vertical rolls at any pass is equal (or about equal) to the distance between the corresponding edges of the horizontal rolls during the previous pass. Figs. 19 and 20 especially illustrate the different positions of the rolls. The proportion between the reductions in length and in breadth for each pass according to this method is the same or nearly the same, and the finding of the different positions to be occupied by the rolls for each pass is easily understood by reference to Fig. 19. Thus, starting from the point $f$, representing the sharp edge of one of the vertical rolls in its extreme position, the point $f'$ (the corresponding sharp edge of one of the horizontal rolls for the same position) is found by tracing the line $f$ at an inclination to the horizontal center line equal to the angle $\propto$. The relative position of $f'$ will then be on the intersection of the line so traced with the vertical center line. Such positions may be numbered 1 and 1', respectively. Striking a circle with radius to 1' about the center of the cross-section—that is to say, the intersection of the horizontal and vertical center lines thereof—point 2 is found. Line 2 2', parallel to 1 1', gives point 2'. Circle with radius to 2' from aforesaid center finds point 3, and the points 3' 4 4' 5 5', &c., are successively found in the same manner till the cross-section is reduced to that required. By the improved method of connecting the rolls the same may be moved apart to a distance heretofore impossible with the closed rolls, and the bloom may be passed direct to this mill without previous roughing down in other mills. The bloom is given to the mill in a rectangular shape, and after one pass and quarter-turn it is shown (in dash and double-dot lines) in Figs. 19 and 20 in position for the second pass. After a few passes it becomes quite cruciform, and the final section, if indicated by the nearest approach of the rolls in Figs. 19 or 20, is reached about the tenth pass.

The horizontal rolls for the cruciform section comprise on each roll faces $x\ x$ at right angles to each other and faces $z\ z$ at an angle to each of the faces $x\ x$, preferably slightly greater than a right angle. The vertical rolls comprise the faces $y\ y$, similar and equal to $x\ x$, and the faces $w\ w$, which make a salient angle with the faces $y\ y$, equal to or less than that between the faces $x$ and $z$. To support the upper horizontal roll in its bearing and to hold it with its spindles firmly against the brasses, and at the same time to counterbalance and uphold the weight of the said roll, its housing-box, and its rails D and other parts, under the spindles of the roll are the bearings J, and the same are supported by levers $e$, each pivoted at one end to the housing-box, or preferably to the ends of the setting-rails D. Each lever $e$ is supported by its center or elsewhere intermediate between its pivot and its point of support of the bearings J by a rod $d$, held upward by balance-weights or by hydraulic pressure or other suitable means.

I do not confine myself to applying the system of adjustment before described only to two pairs of rolls, one vertical and one horizontal, since obviously the rolls may all be inclined, and, furthermore, the principle is equally applicable to three rolls or to more than four rolls, the essential conditions being only that the axes of the rolls shall all lie in the same plane, and that the housing-boxes of the rolls shall be provided with inclined surfaces so acting on each other that while the rolls themselves are never in contact with each other the inward movement of a certain one or more of those rolls in the axial plane of the rollers shall cause the simultaneous inward movement of the other rolls for the amount necessary to contract the roll by the action of the said inclined surfaces.

I therefore claim—

1. In rolling-mills, the combination of rolls axially situated in the same plane and adjustable back and forth toward a center in said plane, housing-boxes for said rolls, and setting-rails D and wedges C on respective housing-boxes, said rails and wedges having coacting inclined surfaces, whereby the adjustment of one or more of said rolls operates the simultaneous adjustment of the remaining rolls, substantially as set forth.

2. The combination of a pair of rolls whose axes lie in a plane and which are adapted to be approached to or receded from each other in said plane, housing-boxes for said rolls, and setting-rails D, having inclined surfaces, as set forth, on said housing-boxes, with a pair of rolls axially situated in said plane and movable in a direction transverse of the aforesaid rolls, housing-boxes for said latter rolls, and wedges having inclined surfaces on said housing-boxes, as and for the purpose set forth.

3. The combination of a pair of rolls whose axes lie in a plane and which are adapted to be approached to or receded from each other in said plane, housing-boxes on said rolls, and setting-rails D, having inclined surfaces on said housing-boxes and adjustable thereon in the plane of adjustment of the rolls, with a pair of rolls axially situated in said plane and movable in a direction transverse of the aforesaid rolls, housing-boxes for said latter rolls, and wedges having inclined surfaces on said housing-boxes, as and for the purpose set forth.

4. The combination, with a roll, of a housing-box above said roll, bearings J below said roll, levers $e$, pivoted at one end to said housing-box and extended under said bearings, rods $d\ d$, connected to said levers, as set forth, and means whereby power is supplied to said rods for the support of said parts, in the manner set forth.

5. The combination of a pair of horizontal rolls adapted to be driven by power with a pair of vertical rolls in the same plane therewith, and with the means described whereby said rolls are adapted to be approached to each other at each pass to a distance equal to that separating the horizontal rolls during the previous pass, for the purpose set forth.

6. In rolls for cruciform sections, a pair of parallel rolls having working-faces $x\ x$, forming a salient right angle, the other edges of said faces connecting with faces $z\ z$, forming re-entering angles therewith, each greater than a right angle, in combination with a pair of parallel rolls at right angles thereto in the same plane and having faces $y\ y$, forming a salient right angle and connecting at their outer edges with faces $w\ w$, forming salient angles not greater than the re-entering angles between $x$ and $z$, the faces $y$ being equal in depth to the faces $x$, as and for the purpose set forth.

In testimony whereof I have signed this specification in the presence of two subscribing witnesses.

PAUL HUGO SACK.

Witnesses:
R. HADDAN,
T. A. RAE.